(12) United States Patent
Kang

(10) Patent No.: US 12,531,262 B2
(45) Date of Patent: Jan. 20, 2026

(54) SUCTION APPARATUS

(71) Applicant: LG Energy Solution, Ltd., Seoul (KR)

(72) Inventor: Choon Kwon Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 111 days.

(21) Appl. No.: 18/574,528

(22) PCT Filed: Feb. 27, 2023

(86) PCT No.: PCT/KR2023/002712
§ 371 (c)(1),
(2) Date: Dec. 27, 2023

(87) PCT Pub. No.: WO2023/167473
PCT Pub. Date: Sep. 7, 2023

(65) Prior Publication Data
US 2024/0243332 A1      Jul. 18, 2024

(30) Foreign Application Priority Data

Mar. 4, 2022   (KR) ................. 10-2022-0028319

(51) Int. Cl.
*B65H 3/08*      (2006.01)
*H01M 10/04*    (2006.01)

(52) U.S. Cl.
CPC ...... *H01M 10/0404* (2013.01); *B65H 3/0816* (2013.01)

(58) Field of Classification Search
CPC ...... B65H 3/0816; B65H 3/08; B65H 3/0808; B65H 3/0833; H01M 10/0404
See application file for complete search history.

(56) References Cited

U.S. PATENT DOCUMENTS 5,029,836 A * 7/1991 Swaneck ............. B65H 3/0816
                                                   414/737
2021/0323781 A1   10/2021 Bae

FOREIGN PATENT DOCUMENTS

| CN | 111807100 A | 10/2020 |
|---|---|---|
| DE | 102007005403 A1 | 8/2008 |
| JP | S5064951 A | 6/1975 |
| JP | H0529795 A | 2/1993 |
| JP | H08268585 A | 10/1996 |
| JP | H10167483 A | 6/1998 |
| JP | 11-255356 * | 9/1999 |
| JP | 2000177857 A | 6/2000 |
| JP | 2003-224144 * | 8/2003 |
| JP | 2006021856 A | 1/2006 |
| JP | 2011246211 A | 12/2011 |
| JP | 2013095558 A | 5/2013 |
| JP | 2019167208 A | 10/2019 |

(Continued)

OTHER PUBLICATIONS

Machine translation of JP11-255356. (Year: 1999).*

(Continued)

*Primary Examiner* — Thomas A Morrison
(74) *Attorney, Agent, or Firm* — Lerner David LLP

(57) ABSTRACT

The disclosed technology relates to a suction apparatus. More specifically, the suction apparatus of the present invention can take out battery cells in a unit of one sheet without damage through a main cam that horizontally reciprocates and a suction unit that moves vertically and horizontally in conjunction with the main cam.

14 Claims, 15 Drawing Sheets

(56) References Cited

FOREIGN PATENT DOCUMENTS

| | | | |
|---|---|---|---|
| JP | 2021-001050 | A | 1/2021 |
| JP | 6820889 | B2 | 1/2021 |
| KR | 2012-0069904 | A | 6/2012 |
| KR | 20150071917 | A | 6/2015 |
| KR | 20160084211 | A | 7/2016 |
| KR | 20180103259 | A | 9/2018 |
| KR | 20200055413 | A | 5/2020 |
| KR | 102122040 | B1 | 6/2020 |
| KR | 20210009779 | A | 1/2021 |
| KR | 20210031148 | A | 3/2021 |
| KR | 102253764 | B1 | 5/2021 |

OTHER PUBLICATIONS

Machine translation of JP2003-224144. (Year: 2003).*
Extended European Search Report including Search Opinion from EP Appl. No. 23763672.5, dated Oct. 21, 2024, pp. 1-7.
International Search Report for PCT/KR2023/002712 mailed May 24, 23. 3 pages.

\* cited by examiner

[FIG. 1]
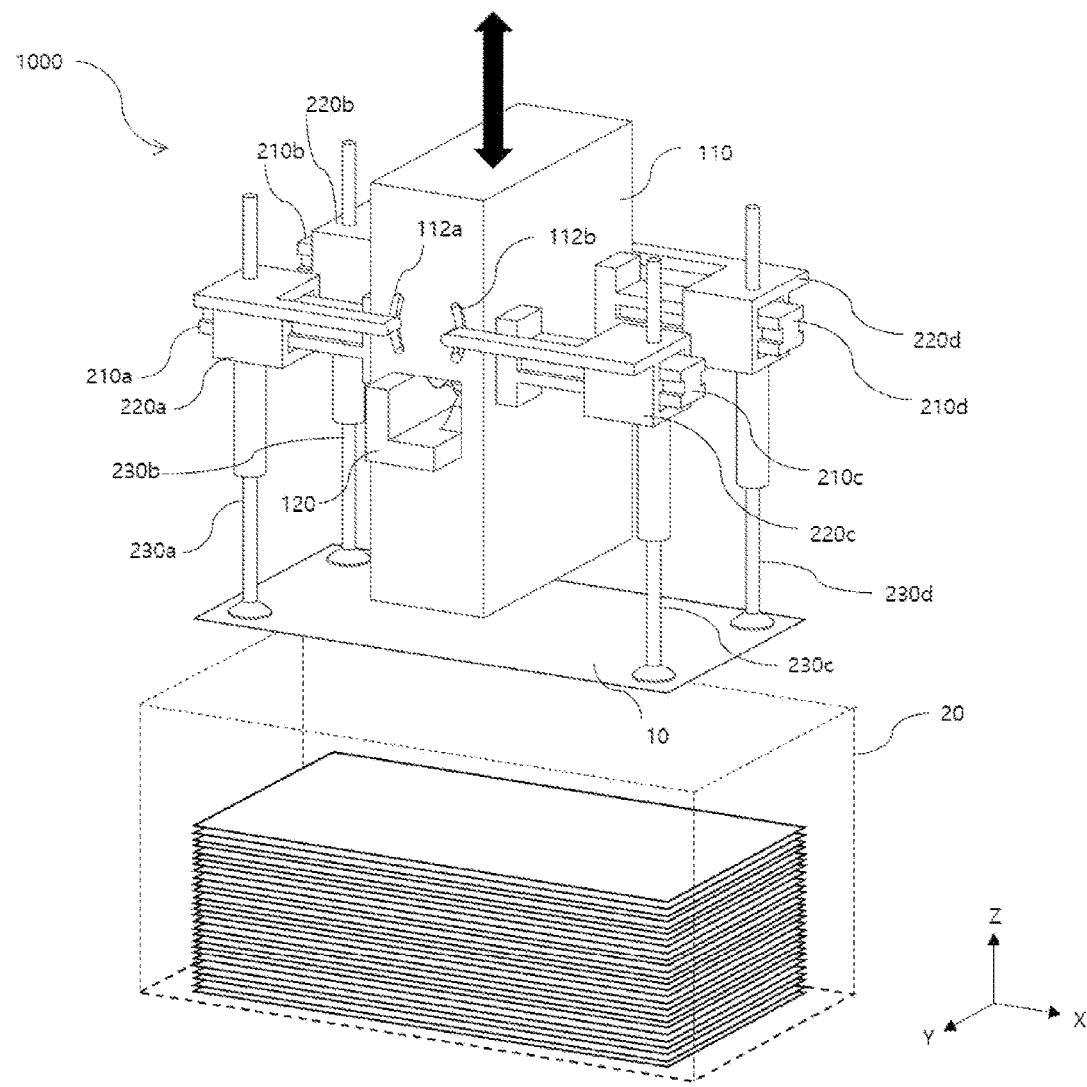

[FIG. 2]
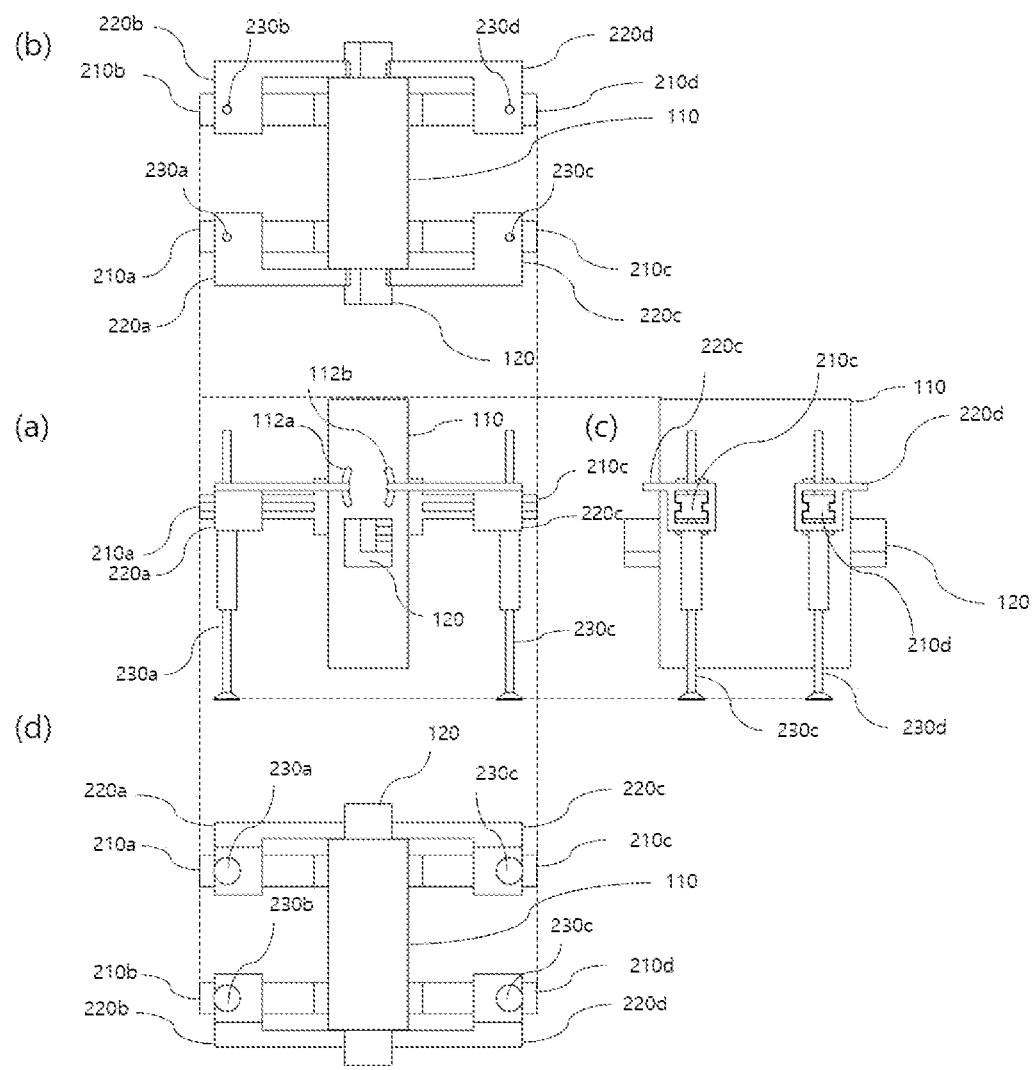

[FIG. 3]
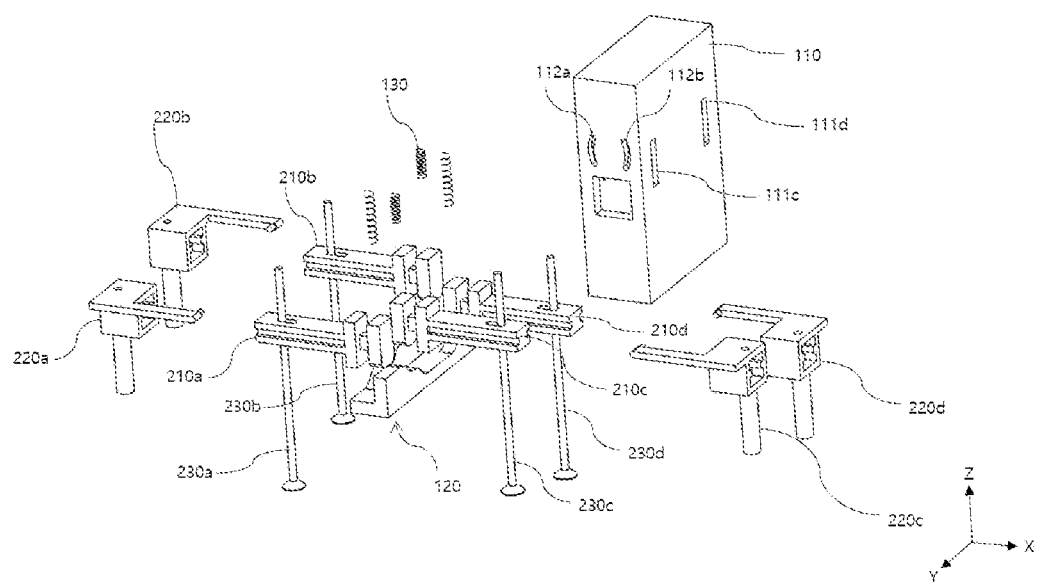

[FIG. 4]
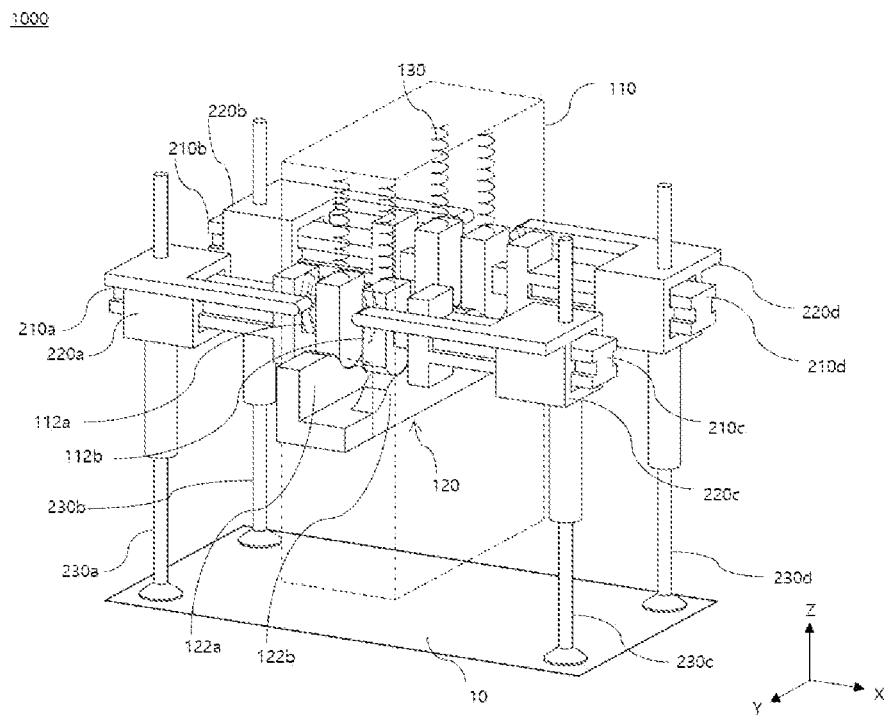
[FIG. 5]
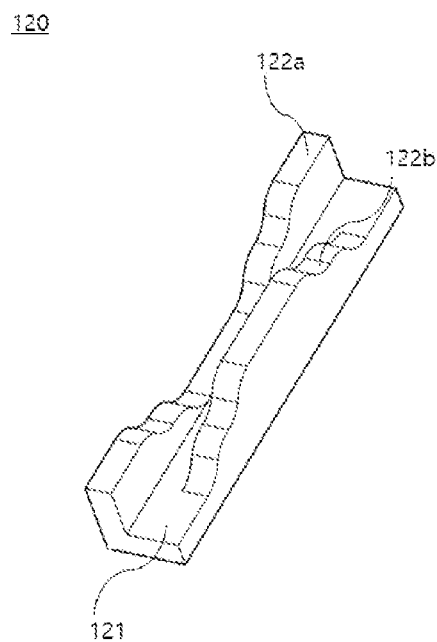

【FIG. 6】
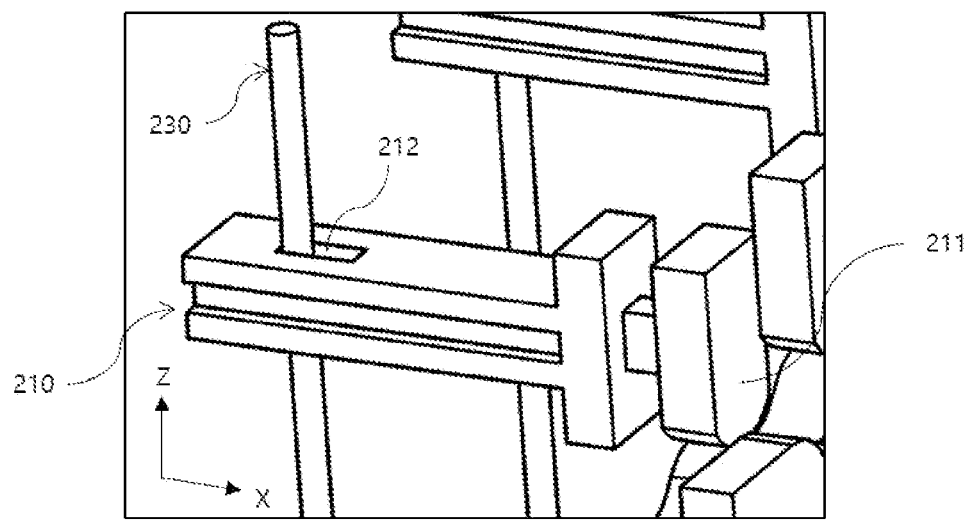
【FIG. 7】
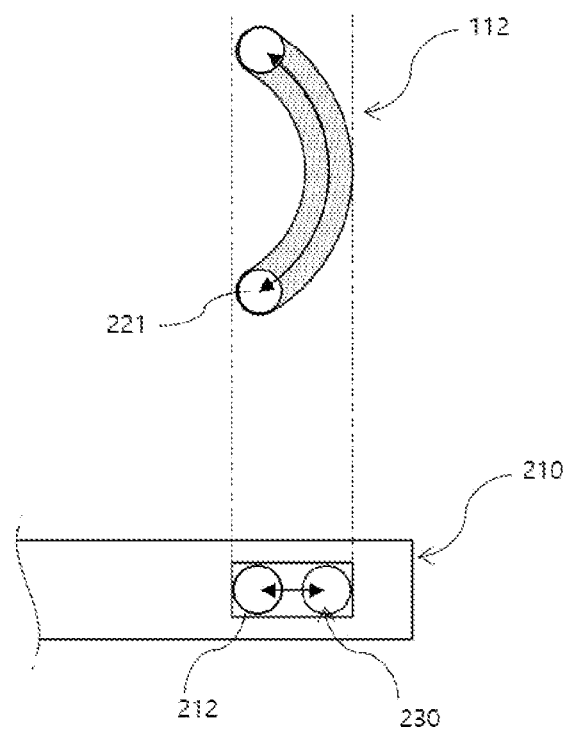

[FIG. 8]
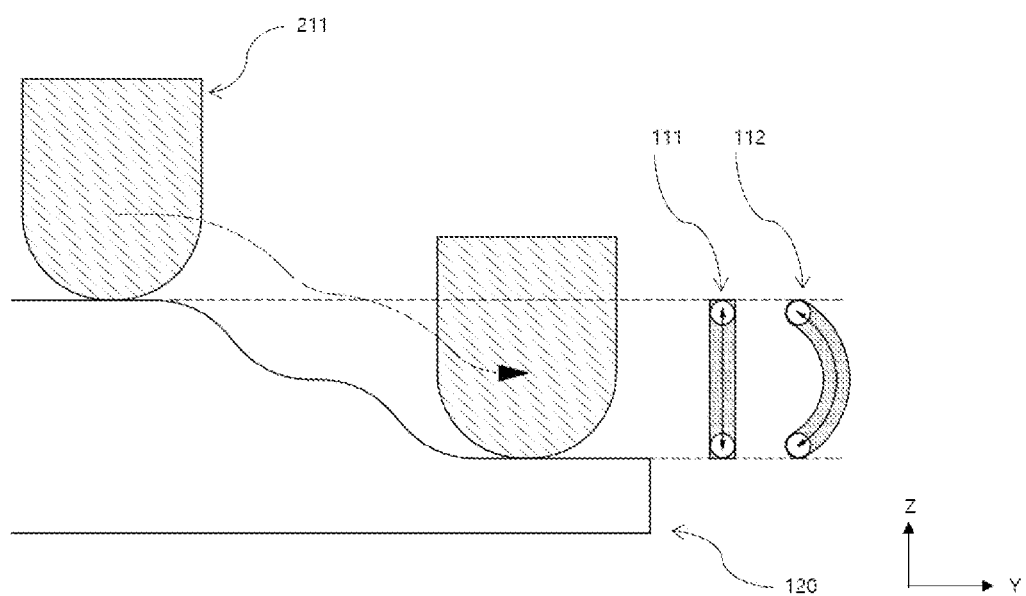

[FIG. 9A]
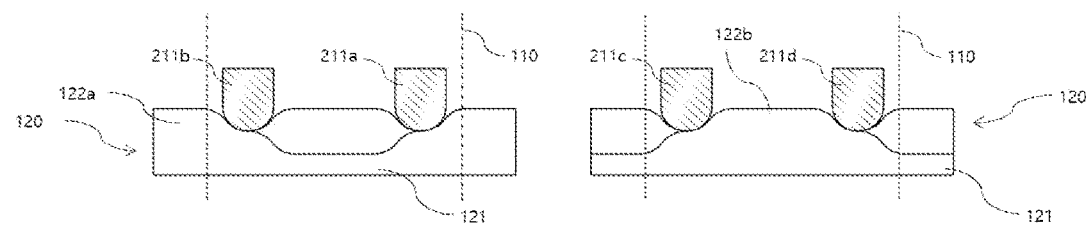
[FIG. 9B]
[FIG. 9C]
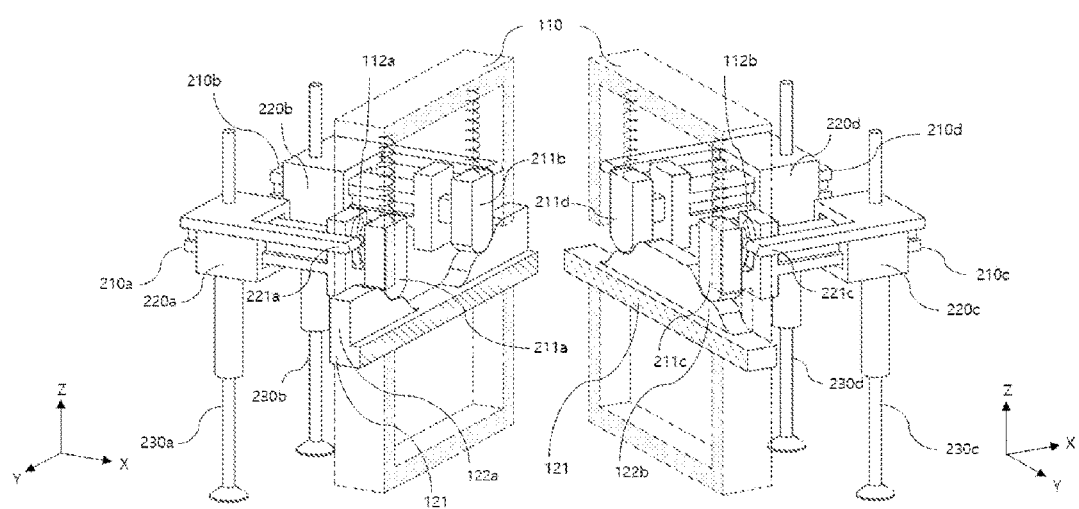

[FIG. 10A]
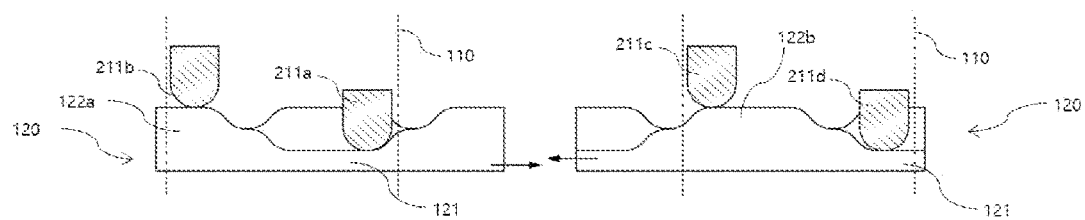
[FIG. 10B]
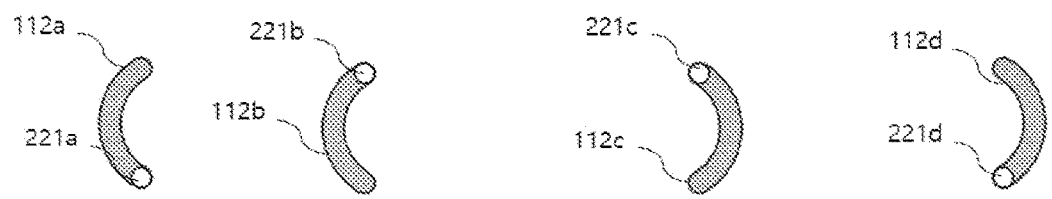
[FIG. 10C]
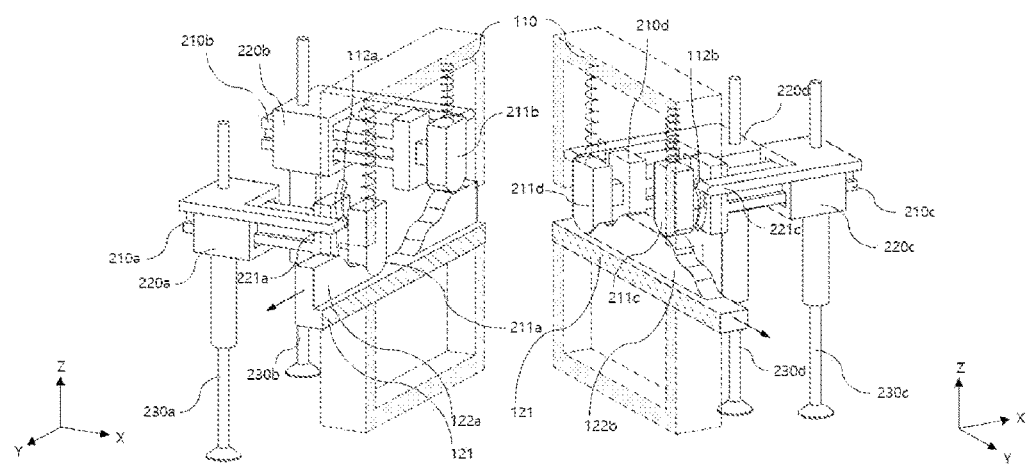

[FIG. 11A]
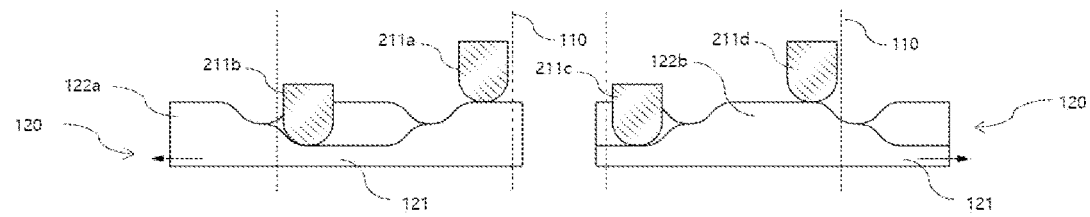
[FIG. 11B]
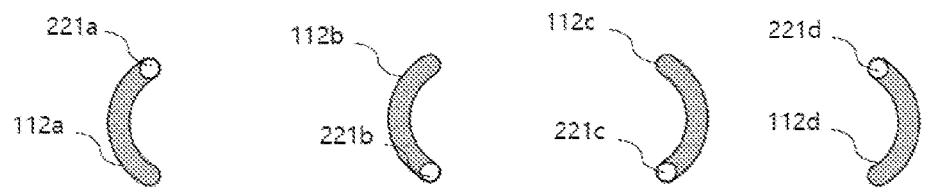
[FIG. 11C]
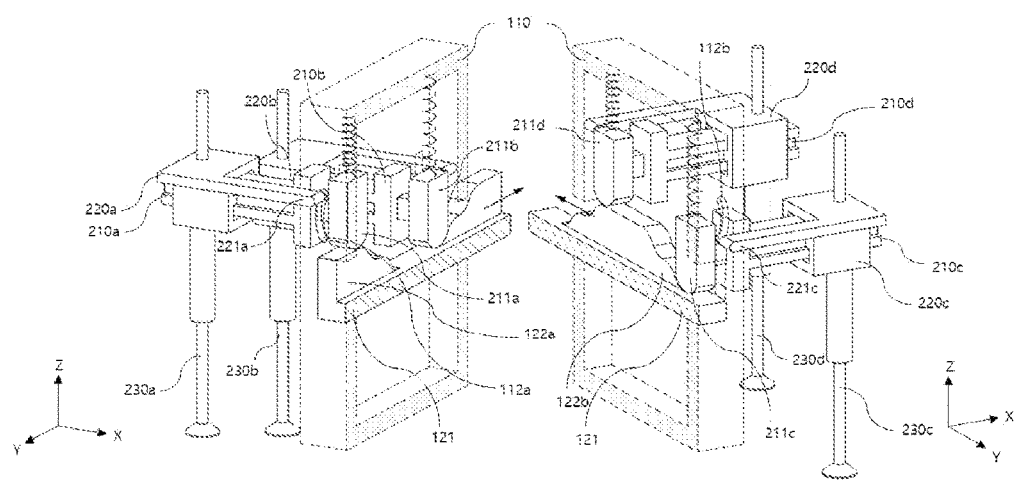

[FIG. 12]
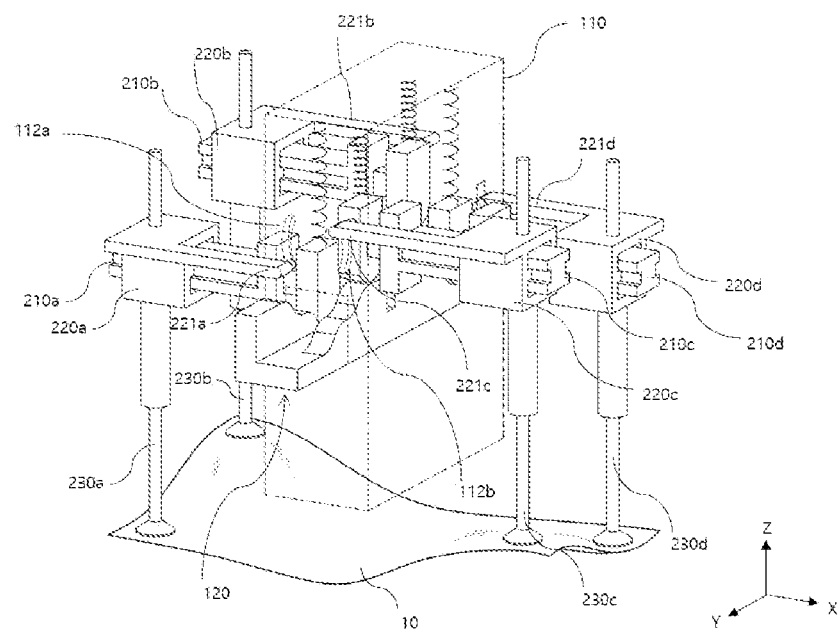
[FIG. 13]
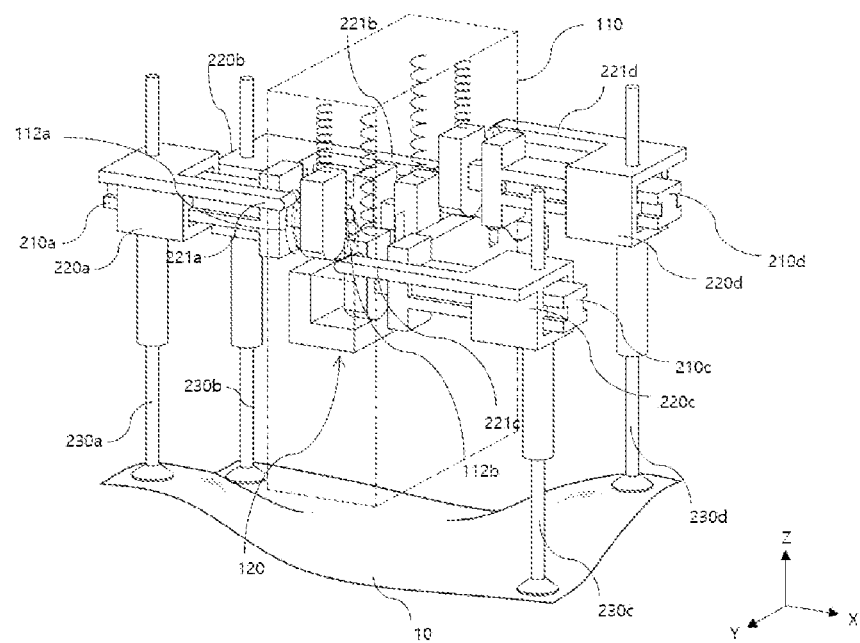

[FIG. 14]
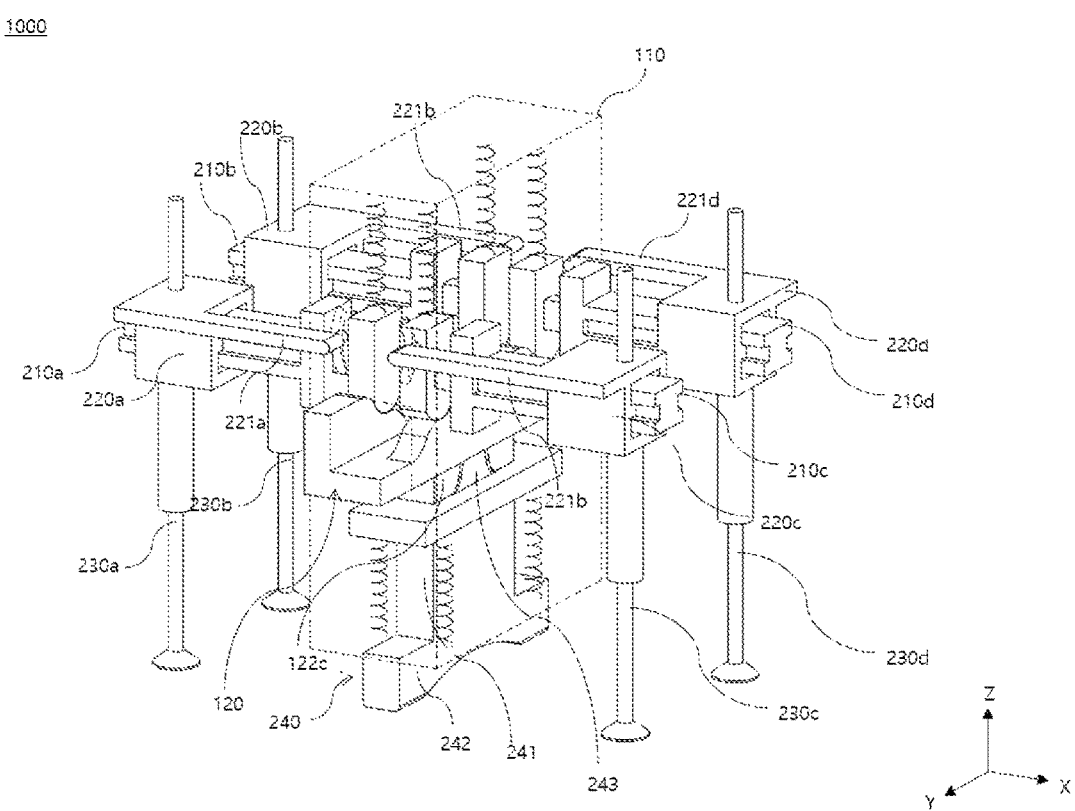

【FIG. 15A】
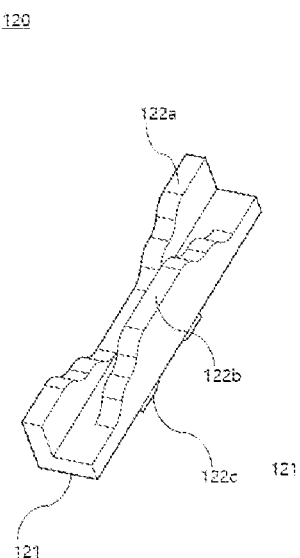
【FIG. 15B】
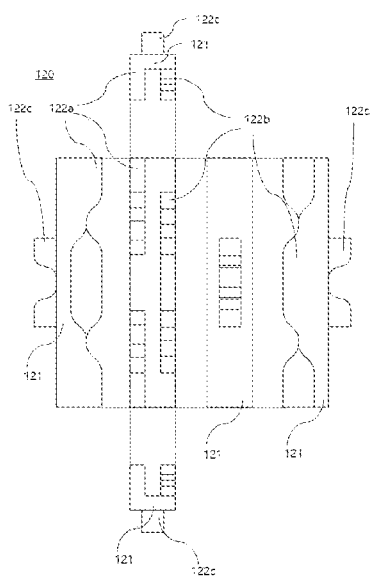

[FIG. 16]
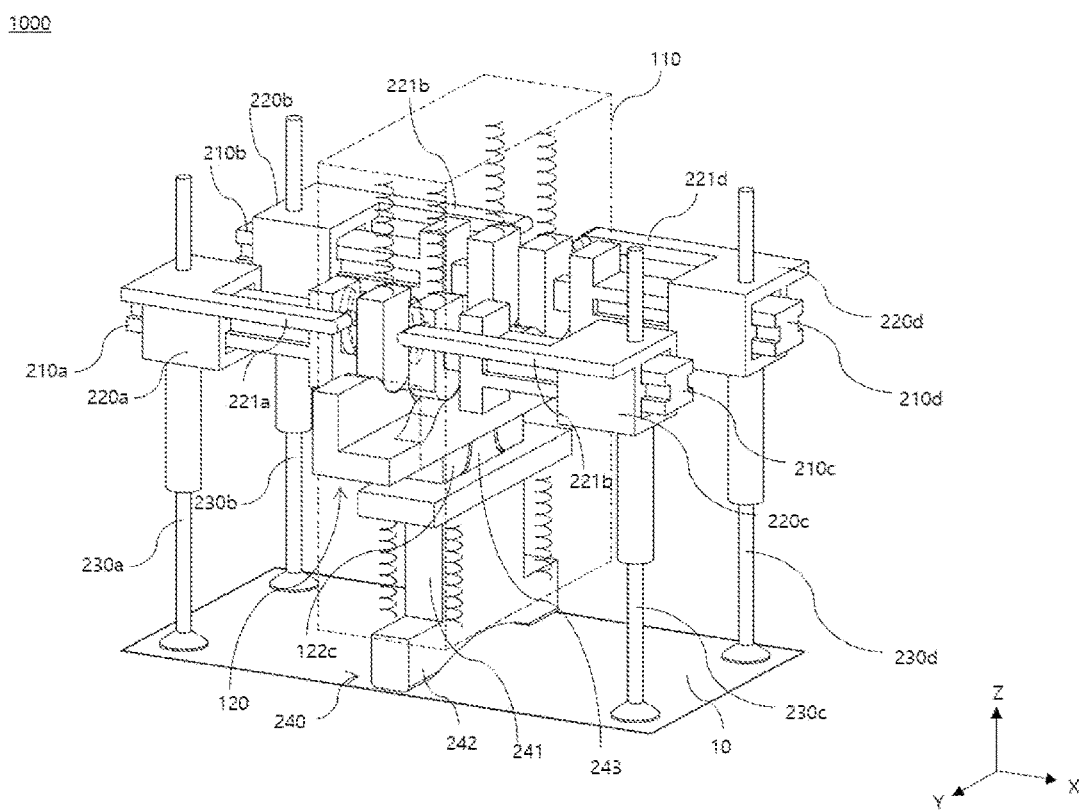

[FIG. 17]
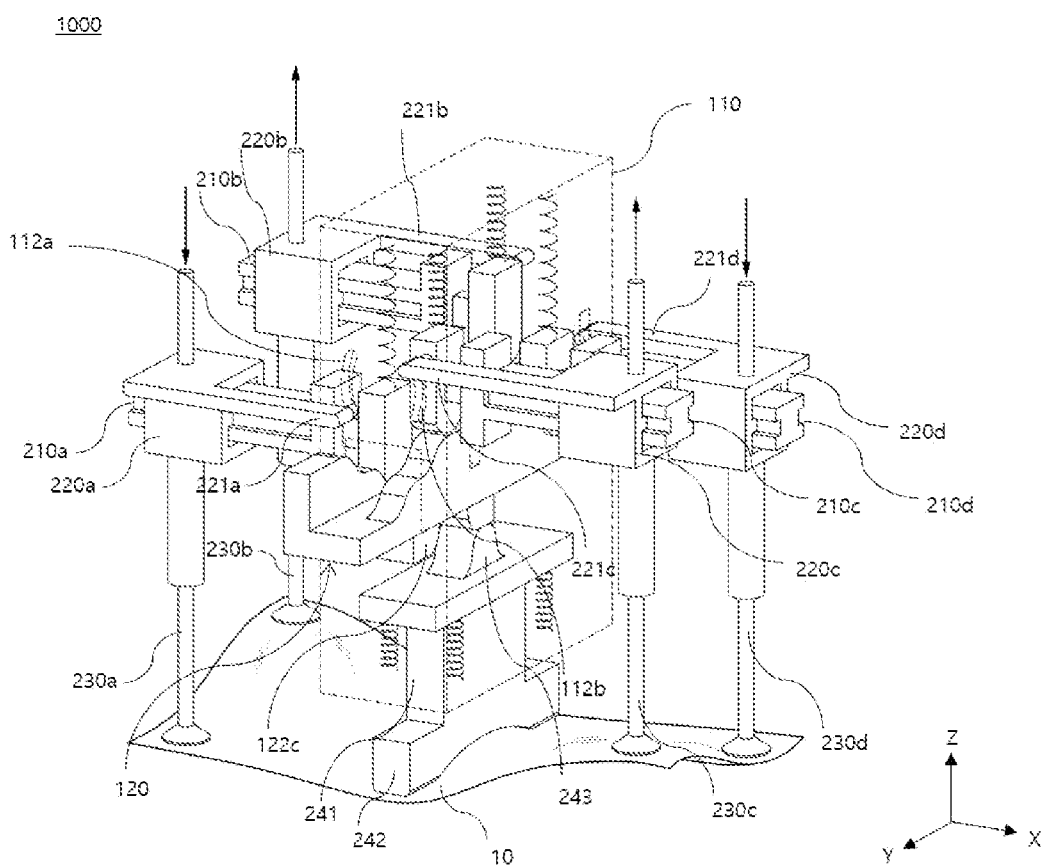

[FIG. 18]
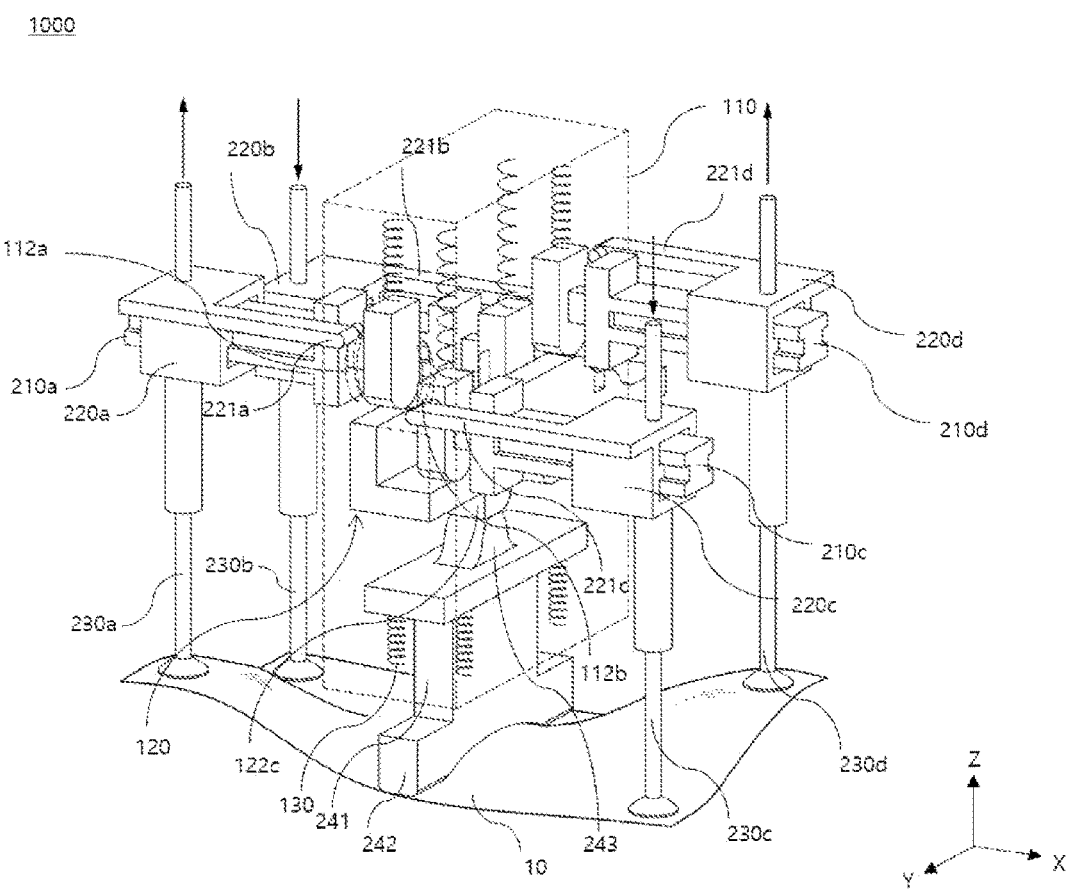

SUCTION APPARATUS

CROSS-REFERENCE TO RELATED APPLICATIONS

The present application is a national phase entry under 35 U.S.C. § 371 of International Application No. PCT/KR2023/002712, filed on Feb. 27, 2023, which claims priority from Korean Patent Application No. 10-2022-0028319, filed on Mar. 4, 2022, all of which are incorporated herein by reference.

TECHNICAL FIELD

The present invention relates to a suction apparatus capable of taking out battery cells in a unit of one sheet without damage.

BACKGROUND TECHNOLOGY OF THE INVENTION

In general, according to a shape of a battery case, battery cells are classified into cylindrical type battery cells in which an electrode assembly is embedded in a cylindrical metal can, prismatic battery cells in which an electrode assembly is embedded in a prismatic metal can, and pouch type battery cells in which an electrode assembly is embedded in a pouch type case of an aluminum laminate sheet. Due to the recent trend toward miniaturization of mobile devices, the demand for prismatic battery cells and pouch type battery cells having thin thicknesses is increasing, and particularly, the pouch type battery cells, of which a shape is easily changeable and which are light-weight, have attracted attention.

An electrode assembly embedded in a battery case is a chargeable and dischargeable power generating device which has a stacked structure of positive electrode/negative electrode/separator. Electrode assemblies are classified into jelly-roll type electrode assemblies in which a separator is interposed between a positive electrode and a negative electrode, each of which is provided in the form of a long sheet coated with an active material, and then the positive electrode, the separator, and the negative electrode are wound, and stacked type electrode assemblies in which a plurality of positive and negative electrodes, which are formed in a certain size, are sequentially stacked with separators interposed therebetween.

As an electrode assembly having a more advanced structure of a mixed form of the jelly-roll type electrode assembly and the stack type electrode assembly, a stack/folding type electrode assembly in which a full cell or a bicell which has a certain unit size is folded using a long continuous separator film has been developed, wherein the full cell has a positive electrode/separator/negative electrode structure, and the bicell has a positive electrode (negative electrode)/separator/negative electrode (positive electrode)/separator/positive electrode (negative electrode) structure.

In addition, in order to improve processability of a conventional stack type electrode assembly and satisfy the demand for various types of rechargeable batteries, a lamination/stack type electrode assembly having a structure formed by stacking unit cells in which electrodes and separators are stacked alternately and laminated has also been developed.

In order to assemble the above-described electrode assemblies, manufactured battery cells are individually taken out and moved from a loading box in which the battery cells are stacked, and to this end, the battery cells are sequentially taken out of the loading box through a taking-out apparatus and a transfer apparatus.

In general, the battery cell is taken out through an apparatus that applies an adsorption force to an upper surface of the battery cell so as not to damage the battery cell, and in this case, there has been a problem that there are taking-out defects such as two or more unit cells being taken out due to static electricity during a process of taking out the unit cell.

Conventionally, in order to solve such a problem of taking-out, battery cells adsorbed by an adsorption apparatus have been twisted and deformed, an impact has been applied to the surface of the battery cells, or a plurality of unit cells attached by static electricity have been separated through an air blowing process.

However, when battery cells are twisted in a one-dimensional direction to separate the battery cells, there is a problem that the attached battery cells are not properly separated. In order to separate battery cells through a twisting method, since the battery cells should be excessively twisted beyond a certain curvature, there has been a problem that the battery cells are damaged. When an impact is simply applied to a battery cell, there has been a problem that scratches occur on a surface of the battery cell. In addition, when strong air pressure is applied to stacked battery cells through an air blowing process, there is a problem that the battery cell that has fallen off may deviate from the original stack position without returning.

[Therefore, there is a need to develop a technology capable of adsorbing and transporting battery cells in a unit of a sheet without damage.

RELATED ART DOCUMENTS

Korean Patent Publication No. 10-2018-0103259

DESCRIPTION OF THE INVENTION

Technical Problem

An object of the present invention is to provide an adsorption apparatus capable of taking out battery cells loaded in a loading box in a unit of a sheet without damage.

Other objects and advantages of the present invention will be understood from the following descriptions and become apparent from the embodiments of the present invention. In addition, it is understood that the objects and advantages of the present invention may be implemented by components defined in the appended claims or their combinations.

Technical Solution

According to the present invention, there is provided is an adsorption apparatus for adsorbing an upper surface of each battery cell loaded in a loading box and sequentially taking out and transporting the battery cells, the adsorption apparatus including a main body including a frame which moves linearly in a Z-axis direction and a main cam which linearly reciprocates in a Y-axis direction inside the frame, and an interlocking unit including a vertical movement unit which moves linearly in the Z-axis direction in conjunction with the main cam and an adsorption unit provided at end portions of the vertical movement unit, wherein the vertical movement unit includes a first vertical movement member and a second vertical movement member which extend to one side of the frame in an X-axis direction and a third movement member and a fourth vertical movement member which extend to the other side of the frame in the X-axis direction, and the main cam vertically moves a pair of vertical movement members of the vertical movement unit, which are disposed in a diagonal direction with the frame interposed therebetween, in the same direction.

The main cam may vertically move a pair of vertical movement members of the vertical movement unit, which are disposed at the same side surface of the frame, in different directions.

The main cam may vertically move a pair of vertical movement members of the vertical movement unit, which are disposed opposite to each other with the frame interposed therebetween, in different directions.

The main cam may include a first flat cam configured to move the first vertical movement member and second vertical movement member in opposite directions, and a second flat cam configured to move the third vertical movement member and fourth vertical movement member in opposite directions, and the first flat cam and the second flat cam may have cam profiles that complement each other.

The vertical movement unit may be guided and moved by a vertical guide slit having a linear shape formed in the Z-axis direction of the frame.

The vertical movement unit may pass through the vertical guide slit to be coupled to the frame and moves in the Z-axis direction along the vertical guide slit.

The interlocking unit may further include a horizontal movement unit which surrounds the vertical movement unit to move in the Z-axis direction together with the vertical movement unit, and the horizontal movement unit may be guided by a horizontal guide slit having a curved shape formed in the Z-axis direction of the frame and may move linearly in the X-axis direction independently of the vertical movement unit.

The horizontal guide slit may include a pair of first horizontal guide slit and second horizontal guide slit formed to be symmetrical to each other in one surface of the frame perpendicular to a moving direction of the main cam, and a pair of third horizontal guide slit and fourth horizontal guide slit formed to be respectively symmetrical to the first horizontal guide slit and second horizontal guide slit in the other surface of the frame.

A pair of horizontal guide slits formed in the same surface of the frame may have a parabolic shape in which a separation distance at both ends is shorter than a separation distance at a center.

The adsorption unit may be fixed to the horizontal movement unit and separated from the vertical movement unit.

The adsorption unit may be provided at an extended end portion of the vertical movement unit and may extend downward from the horizontal movement unit.

The adsorption unit may move in the Z-axis direction according to the movement of the vertical movement unit and simultaneously move in the X-axis direction according to the movement of the horizontal movement unit.

The adsorption apparatus may further include an elastic member disposed between the vertical movement unit and the frame.

The interlocking unit may further include a press unit which is disposed below the main cam, passes through a lower portion of the frame, and linearly reciprocates in the Z-axis direction in conjunction with movement of the main cam.

The press unit may include a support part which vertically extends and is coupled to be slidable with respect to the frame, and a pressing part which extends from a lower end of the support part in a width direction of the battery cell and has a parabolic concave surface formed at a lower portion thereof.

Advantageous Effects

According to the present invention, an omnidirectional curvature is generated in a plurality of battery cells, thereby effectively separating the battery cells attached by static electricity. Furthermore, the battery cells can be effectively prevented from being damaged in a process of separating the battery cells.

BRIEF DESCRIPTION OF THE DRAWINGS

FIG. 1 is a perspective view of an adsorption apparatus according to a first embodiment of the present invention.

FIG. 2 is a set of a front view, a plan view, a side view, and a bottom view of the adsorption apparatus according to the first embodiment of the present invention.

FIG. 3 is an exploded perspective view of the adsorption apparatus according to the first embodiment of the present invention.

FIG. 4 is a perspective view of the adsorption apparatus from which a frame is omitted according to the first embodiment of the present invention.

FIG. 5 is a perspective view of a main cam according to the first embodiment of the present invention.

FIG. 6 illustrates a vertical movement member of the present invention.

FIG. 7 illustrates a part of a horizontal guide slit and the vertical movement member of the present invention.

FIG. 8 briefly illustrates a part of a main cam and a vertical follower.

FIG. 9 illustrates the adsorption apparatus according to the first embodiment of the present invention when the main cam is in a ready state.

FIG. 10 illustrates the adsorption apparatus according to the first embodiment of the present invention when the main cam moves forward.

FIG. 11 illustrates the adsorption apparatus according to the first embodiment of the present invention when the main cam moves backward.

FIG. 12 is a perspective view of the adsorption apparatus according to the first embodiment of the present invention when the main cam moves forward in a state in which a battery cell is adsorbed.

FIG. 13 is a perspective view of the adsorption apparatus according to the first embodiment of the present invention when the main cam moves backward in a state in which the battery cell is adsorbed.

FIG. 14 is a perspective view of an adsorption apparatus according to a second embodiment of the present invention.

FIGS. 15A and 15B is a perspective view of a main cam according to the second embodiment of the present invention.

FIG. 16 is a perspective view of the adsorption apparatus according to the second embodiment of the present invention when the main cam is in a ready state in a state in which a battery cell is adsorbed.

FIG. 17 is a perspective view of the adsorption apparatus according to the second embodiment of the present invention when the main cam moves forward in a state in which the battery cell is adsorbed.

FIG. 18 is a perspective view of the adsorption apparatus according to the second embodiment of the present invention when the main cam moves backward in a state in which the battery cell is adsorbed.

BEST MODE FOR CARRYING OUT THE INVENTION

Hereinafter, embodiments of the present invention will be described in detail with reference to the accompanying drawings. Prior to the description, it should be understood that terms used in the present specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments described in the specification and the configurations shown in the drawings are merely most exemplary embodiments of the present invention and do not represent all the technical ideas of the present invention. Thus, it is to be understood that there may be various equivalents and variations in place of them at the time of filing the present application.

In addition, in describing the present invention, when it is determined that detailed descriptions of well-known functions or constructions involved in the present invention may obscure the gist of the present invention, the detailed descriptions thereof will be omitted.

The embodiments of the present invention are provided to more fully describe the present disclosure to those skilled in the art, and the shapes and sizes of components in the drawings may be exaggerated, omitted, or schematically illustrated for clearer description. Thus, the size or ratio of a component does not entirely reflect its actual size or ratio.

The present invention relates to an adsorption apparatus for adsorbing an upper surface of each battery cell loaded in a loading box and sequentially taking out and transporting the battery cells. The adsorption apparatus of the present invention includes a main body and an interlocking unit.

FIGS. 1 to 13 illustrate an adsorption apparatus according to a first embodiment of the present invention. FIGS. 14 to 18 illustrate an adsorption apparatus according to a second embodiment of the present invention.

Hereinafter, an adsorption apparatus according to two embodiments of the present invention will be described in detail with reference to the accompanying drawings. However, for ease of understanding, a position at which each component is disposed and a direction in which each component operates will be described with reference to XYZ coordinates illustrated in each drawing.

First Embodiment

FIG. 1 is a perspective view of an adsorption apparatus 1000 according to a first embodiment of the present invention. FIG. 2 is a set of a front view, a plan view, a side view, and a bottom view of the adsorption apparatus 1000 according to the first embodiment of the present invention. FIG. 3 is an exploded perspective view of the adsorption apparatus 1000 according to the first embodiment of the present invention.

As illustrated in the drawings, the adsorption apparatus 1000 according to the first embodiment of the present invention may mainly include a main body and an interlocking unit.

The main body includes a frame 110 and a main cam 120.

The frame 110 is connected to a driving unit (not shown) that generates horizontal movement and vertical movement. Specifically, in order to take out battery cells 10 arranged and loaded in a loading box 20, the frame 110 moves horizontally toward the loading box 20 in an X-axis or Y-axis direction and moves (up or down) above the loading box 20 in a Z-axis direction with respect to the battery cell 10.

As illustrated in FIG. 1, the frame 110 moves linearly above the loading box 20 in the Z-axis direction.

The main cam 120 is disposed to linearly reciprocate in a horizontal direction inside the frame 110.

The main cam 120 is provided inside or outside the frame 110 and is connected to a driving unit (not shown), which generates horizontal movement, and linearly reciprocates in the Y-axis direction under the driving unit.

As illustrated in FIG. 1, the main cam 120 may be disposed to pass through the frame 110. In this case, the main cam 120 is mounted on the frame 110 to move. However, the movement of the main cam 120 is not limited thereto, and the main cam 120 may linearly reciprocate in the Y-axis direction along a separate guide rail (not shown) installed in the Y-axis direction inside the frame 110.

The interlocking unit includes vertical movement units 210 and adsorption units 230.

The vertical movement unit 210 is formed to extend from both sides of the frame 110 in the X-axis direction, and the adsorption unit 230 is provided at an end portion of each vertical movement unit 210.

The adsorption unit 230 is connected to an adsorption source (not shown), which provides an adsorption force, and applies the adsorption force applied through the adsorption source to an upper surface of the battery cell 10 loaded in the loading box 20 to adsorb the battery cell 10. In this case, it is preferable that the adsorption unit 230 be positioned to correspond to each corner of the battery cell 10. In addition, it is preferable that the adsorption unit 230 adsorb each corner of the battery cell 10 such that the battery cell 10 does not sag in one direction.

The frame 110 moves down toward the battery cell 10 loaded in the loading box 20 and moves up after the adsorption unit 230 adsorbs the battery cell 10.

The adsorption apparatus 1000 of the present invention is characterized in that the battery cell 10 loaded in the loading box 20 is taken out without damage to a unit of one sheet through the interlocking unit that operates in conjunction with the movement of the main cam 120.

Hereinafter, a configuration of each of the main cam 120 and the interlocking unit will be described in more detail with reference to FIGS. 4 to 13.

FIG. 4 is a perspective view of the adsorption apparatus 1000 from which the frame 110 is omitted according to the first embodiment of the present invention.

Referring to FIG. 4, the vertical movement unit 210 is disposed in contact with an upper surface of the main cam 120 inside the frame 110.

The vertical movement unit 210 moves up or down in the Z-axis direction as the main cam 120 moves horizontally in the Y-axis direction.

The vertical movement units 210 include first vertical movement members 210a and second vertical movement members 210b disposed to extend to one side of the frame 110 in the X-axis direction (left direction in the drawing), and third vertical movement members 210c and fourth vertical movement members 210d disposed to extend to the other side of the frame 110 in the X-axis direction (the other direction in the drawing).

Each of the vertical movement members is disposed in contact with the main cam 120.

Specifically, the first to fourth vertical movement members 210a, 210b, 210c, and 210d move linearly in the Z-axis direction in conjunction with the main cam 120. Specifically, the first vertical movement members 210a and second vertical movement member 210b each pass through one side of the frame 110 to be in contact with the main cam 120, and the third vertical movement members 210c and fourth vertical movement members 210d each pass through the other side of the frame 110 to be in contact with the main cam 120.

The vertical movement member includes a vertical follower 211 having a curved surface, which is downwardly convex, at an end portion thereof. A lower surface of the vertical follower 211 is in contact with the main cam 120 and smoothly slides along the upper surface of the main cam 120.

The vertical follower 211 may be divided into a first vertical follower 211a formed at an end portion of the first vertical movement member 210a, a second vertical follower 211b formed at an end portion of the second vertical movement member 210b, a third vertical follower 211c formed at an end portion of the third vertical movement member 210c, and a fourth vertical follower 211d formed at an end portion of the fourth vertical movement member 210d.

The frame 110 includes vertical guide slits 111 having a linear shape formed in both side surfaces thereof in the Z-axis direction as illustrated in FIG. 3, and the vertical movement member passes through the vertical guide slit 111 to be in contact with the main cam 120 inside the frame 110. In addition, the vertical movement member may be guided and moved in the Z-axis direction by the vertical guide slit 111. That is, the vertical movement member is movable in an extending direction of the vertical guide slit 111.

The vertical guide slit 111 guides the movement of the vertical movement member in the Z-axis direction but restricts the movement of the vertical movement member in the Y-axis direction.

The vertical guide slit 111 may be formed to correspond to each vertical movement member. For example, the vertical guide slits may include a first vertical guide slit 111a for guiding the movement of the first vertical movement member 210a, a second vertical guide slit 111b for guiding the movement of the second vertical movement member 210b, a third vertical guide slit 111c for guiding the movement of the third vertical movement member 210c, and a fourth vertical guide slit 111d for guiding the movement of the fourth vertical movement member 210d.

Since the vertical movement unit 210 should continuously interlock with the main cam 120 to operate, it is preferable that the vertical follower 211 of the vertical movement unit 210 maintain contact with the main cam 120.

In order to maintain the contact with the main cam 120, the adsorption apparatus 1000 of the present invention may further include an elastic member 130 between the vertical follower 211 and the frame 110 as illustrated in FIGS. 3 and 4.

Even when the main cam 120 moves, the vertical follower 211 may remain in contact with a surface of the main cam 120 under an elastic force of the elastic member 130.

The main cam 120 of the present invention reciprocates in the Y-axis direction due to the driving unit to allow each vertical movement member in contact with the main cam 120, specifically the vertical follower 211, to be at a specific level.

FIG. 5 is a perspective view of the main cam 120 according to the first embodiment of the present invention.

The main cam 120 is connected to the driving unit (not shown), which generates horizontal movement, and reciprocates inside the frame 110.

Specifically, the main cam 120 includes a base plate 121 and a flat cam 122 protruding in a curved shape from the base plate 121. In this case, a cam profile may be determined according to a shape of the flat cam 122.

The main cam 120 may be formed in multiple stages, but the present invention is not particularly limited thereto.

The flat cam 122 includes a first flat cam 122a and a second flat cam 122b which are formed to protrude upward from both end portions of the base plate 121. The first flat cam 122a, the second flat cam 122b, and the base plate 121 allow the vertical movement members in contact therewith to be positioned at specific levels through the horizontal movement of the main cam 120.

As illustrated in FIGS. 4 and 5, the first flat cam 122a is in contact with the first vertical movement members 210a and second vertical movement members 210b, and the second flat cam 122b is in contact with the third vertical movement members 210c and fourth vertical movement members 210d.

As illustrated in FIG. 5, the first flat cam 122a is formed such that a level thereof becomes higher toward both ends of the main cam 120, and the second flat cam 122b is formed such that a level thereof becomes higher toward a center of the main cam 120. That is, the first flat cam 122a and the second flat cam 122b have cam profiles that complement each other.

In the adsorption apparatus 1000 according to the first embodiment of the present invention, the vertical movement members are positioned at specific levels by the first flat cam 122a and the second flat cam 122b having cam profile structures that complement each other.

Specifically, the first vertical movement members 210a and second vertical movement members 210b in contact with the first flat cam 122a move in opposite directions with respect to the Z-axis direction as the main cam 120 moves horizontally in the Y-axis direction, and the third vertical movement members 210c and fourth vertical movement members 210d in contact with the second flat cam 122b also move in opposite directions with respect to the Z-axis direction as the main cam 120 moves horizontally in the Y-axis direction. The specific operation of the first flat cam 122a and the second flat cam 122b and the first to fourth vertical movement members 210a, 210b, 210c, and 210d in contact therewith will be described again below with reference to FIGS. 9 to 13.

The adsorption unit 230 of the present invention is provided at the end portion of the vertical movement unit 210 but is not coupled directly to the vertical movement unit 210.

As illustrated in FIG. 6, the adsorption unit 230 is provided to pass through a reciprocating guide slit 212 that is open in the Z-axis direction at the end portion of the vertical movement member and is formed to extend in the X-axis direction. In this case, since the vertical movement member and the absorption unit 230 are not directly coupled, even when the vertical movement member substantially moves up or down in the Z-axis direction, the vertical movement member cannot move the absorption unit 230 in the X-axis direction or the Z-axis direction.

The interlocking unit of the present invention may further include horizontal movement units 220 capable of transmitting a driving force generated by the main cam 120 to the absorption unit 230 to move the absorption unit 230 in the X-axis direction and the Z-axis direction.

The horizontal movement unit 220 is coupled to the vertical movement unit 210 to move together with the vertical movement unit 210 in the Z-axis direction according to the movement of the vertical movement unit 210.

As illustrated in FIGS. 1, 2, and 4, the horizontal movement unit 220 surrounds the vertical movement unit 210 and is disposed to be linearly movable in the X-axis direction with respect to the vertical movement unit 210.

The horizontal movement unit 220 is formed to correspond to the vertical movement member. For example, the horizontal movement units 220 include a first horizontal movement member 220a coupled to the first vertical movement member 210a, a second horizontal movement member 220b coupled to the second vertical movement member 210b, a third horizontal movement member 220c coupled to the third vertical movement member 210c, and a fourth horizontal movement member 220d coupled to the fourth vertical movement member 210d.

The absorption unit 230 of the present invention is coupled to the horizontal movement unit 220 to move in the Z-axis direction according to the movement of the horizontal movement unit 220. Specifically, the adsorption unit 230 passes through both of the horizontal movement unit 220 and the vertical movement unit 210 in the Z-axis direction, is fixed to the horizontal movement unit 220, and is supported on the reciprocating guide slit 212 of the vertical movement unit 210. In this case, as illustrated in FIGS. 1, 2, and 4, the adsorption unit 230 coupled to the horizontal movement unit 220 is formed to extend downward from the horizontal movement unit 220.

The adsorption unit 230 may be divided to correspond to the horizontal movement unit 220 or the vertical movement unit 210. For example, the adsorption units 230 include a first adsorption member 230a coupled to the first horizontal movement member 220a, a second adsorption member 230b coupled to the second horizontal movement member 220b, a third adsorption member 230c coupled to the third horizontal movement member 220c, and a fourth adsorption member 230d coupled to the fourth horizontal movement member 220d.

The horizontal movement unit 220 is guided by a horizontal guide slit 112 having a curved shape formed in the frame 110 in the Z-axis direction and is linearly moved in the X-axis direction independently of the vertical movement unit 210. Accordingly, the absorption unit 230 coupled to the horizontal movement unit 220 moves in the X-axis direction.

The horizontal movement unit 220 coupled to the vertical movement unit 210 may include a horizontal guide portion 221 formed to extend toward the horizontal guide slit 112 and inserted into the horizontal guide slit 112.

In the present invention, for convenience, the horizontal guide portion 221 included in the first horizontal movement member 220a is referred to as a first horizontal guide portion, the horizontal guide portion 221 included in the second horizontal movement member 220b is referred to as a second horizontal guide portion, the horizontal guide portion 221 included in the third horizontal movement member 220c is referred to as a third horizontal guide portion, and the horizontal guide portion 221 included in the fourth horizontal movement member 220d is referred to as a fourth horizontal guide portion.

As illustrated in FIGS. 1 and 3, a pair of horizontal guide slits 112 are formed in a front surface of the frame 110 (the rear surface is not shown).

The horizontal guide slits 112 are divided into a pair of first horizontal guide slit 112a and second horizontal guide slit 112b formed to be symmetrical to each other in one surface of the frame 110 perpendicular to a moving direction of the main cam 120, and a pair of third horizontal guide slit 112c and fourth horizontal guide slit 112d formed to be respectively symmetrical to the first horizontal guide slits 112a and second horizontal guide slit 112b in the other surface of the frame 11.

As illustrated in FIG. 1, a first horizontal guide portion 221a and a third horizontal guide portion 221c are inserted into the first horizontal guide slit 112b and second horizontal guide slit 112b, and on the other hand, a second horizontal guide portion 221b and a fourth horizontal guide portion 221d are inserted into the third horizontal guide slit 112c and fourth horizontal guide slit 112d.

As illustrated in FIGS. 1 and 3, the pair of horizontal guide slits 112 are formed to have a parabolic shape such that a separation distance at both ends is shorter than a separation distance at a center.

The horizontal movement unit 220 guided by the horizontal guide slit 112 having a parabolic shape and moved up or down in the Z-axis direction by the vertical movement unit 210 may be moved in the X-axis direction by the horizontal guide slit 112. Therefore, the absorption unit 230 fixed to the horizontal movement unit 220 is also moved in the X-axis direction according to the movement of the horizontal movement unit 220. In this case, a distance in the X-axis direction by which the horizontal movement unit 220 is guided and moved by the horizontal guide slit 112 may be the same as a movement distance in the X-axis direction by which the absorption unit 230 is fixed to the horizontal movement unit 220 and is moved in the X-axis direction. That is, a position of the absorption unit 230 moving in the X-axis direction is influenced by a position of the horizontal movement unit 220 guided by the horizontal guide slit 112.

FIG. 7 illustrates the horizontal guide slit 112 and the reciprocating guide slit 212 of the vertical movement member. Referring to FIG. 7, a movement distance of the horizontal guide portion moving in the X-axis direction in the horizontal guide slit 112 is the same as a movable distance of the adsorption unit 230 moving in the X-axis direction in the reciprocating guide slit 212 of the vertical movement member.

In addition, as illustrated in FIG. 7, when the horizontal guide portion of the horizontal movement unit 220 is positioned at an end portion of the horizontal guide slit 112, the adsorption unit 230 is positioned at a left end portion of the reciprocating guide slit 212.

On the other hand, when the horizontal guide portion of the horizontal movement unit 220 is positioned at a central portion of the horizontal guide slit 112, the adsorption unit 230 is positioned at a right end portion of the reciprocating guide slit 212.

FIG. 8 briefly illustrates a level change of the vertical follower 211 following a cam profile of the main cam 120 by driving of the main cam 120, the vertical movement member including the vertical follower 211, and the horizontal movement member coupled to the vertical movement member. However, the movement of the vertical follower 211 is intentionally illustrated in FIG. 8 to help understanding, and in the adsorption apparatus 1000 of the present invention, actually, the movement of the vertical movement member in the Y-axis direction is restricted by the vertical guide slit 111 so that the vertical follower 211 remains fixed in place. That is, as the main cam 120 moves horizontally in the Y-axis direction, the vertical follower 211 moves vertically along the upper surface of the main cam 120.

As illustrated in FIG. 8, the vertical follower 211 moves along the upper surface of the main cam 120 formed in multiple stages, and in this case, a movement distance thereof in the Z-axis direction is the same as a movement direction of the vertical movement member guided and moved in the Z-axis direction by the vertical guide slit 111 and a movement distance of the horizontal movement member guided and moved in the Z-axis direction by the horizontal guide slit 112. In this case, when the vertical follower 211 is positioned at the top of the main cam 120, the vertical movement member and the horizontal movement member are also positioned at the tops of the vertical guide slit 111 and the horizontal guide slit 112, respectively.

In the adsorption apparatus 1000 of the present invention, the vertical movement unit 210 and the horizontal movement unit 220 included in the interlocking unit move in conjunction with the movement of the main cam 120. In conclusion, in the adsorption apparatus 1000 of the present invention, four adsorption units 230 adsorbing the battery cell 10 are moved in the X-axis and Z-axis directions, thereby generating an omnidirectional curvature in the battery cell 10.

Hereinafter, the operation of the adsorption apparatus 1000 according to the first embodiment of the present invention will be described with reference to FIGS. 9 to 13.

FIG. 9 illustrates a position of each component of the adsorption apparatus 1000 according to the first embodiment of the present invention when the main cam 120 is in a ready state.

FIG. 9A illustrates the first vertical follower 211a and the second vertical follower 211b in contact with the first flat cam 122a, and the third vertical follower 211c and the fourth vertical follower 211d in contact with the second flat cam 122b.

FIG. 9B illustrates a position of the horizontal guide portion 221 in the horizontal guide slit 112 when the first vertical follower 211a, the second vertical follower 211b, the third vertical follower 211c, and the fourth vertical follower 211d are at positions of FIG. 9A on the first flat cam 122a and the second flat cam 122b.

FIG. 9C is a set of cross-sectional perspective views of the adsorption apparatus 1000 when the first vertical follower 211a, the second vertical follower 211b, the third vertical follower 211c, and the fourth vertical follower 211d are at the positions of FIG. 9A on the first flat cam 122a and the second flat cam 122b.

Referring to FIG. 9, when each vertical follower 211 is positioned at an intermediate height of each of the first flat cam 122a and the second flat cam 122b, all levels in the Z-axis direction are the same. Therefore, the vertical movement member including each vertical follower 211 and the horizontal movement member coupled to the vertical movement member are positioned at the same position with respect to the Z-axis direction. In addition, as illustrated, the horizontal guide portions 221 of the horizontal movement members are equally positioned at the central portion of the horizontal guide slit 112.

When the vertical follower 211 and the horizontal guide portion 221 are at positions as illustrated in FIGS. 9A and 9B, the first adsorption member 230a, the second adsorption member 230b, the third adsorption member 230c, and the fourth adsorption member 230d coupled to the horizontal movement members are spaced apart from the frame 110 at equal intervals and are positioned at the same level in the Z-axis direction.

When the adsorption unit 230 is at a position illustrated in FIG. 9, the frame 110 of the present invention moves down in the Z-axis direction to adsorb the upper surface of the battery cell 10.

FIG. 10 illustrates a position of each component of the adsorption apparatus 1000 according to the first embodiment of the present invention when the main cam 120 moves forward in the Y-axis direction.

FIG. 10A illustrates the first vertical follower 211a and the second vertical follower 211b in contact with the first flat cam 122a, and the third vertical follower 211c and the fourth vertical follower 211d in contact with the second flat cam 122b.

FIG. 10B illustrates a position of the horizontal guide portion 221 in the horizontal guide slit 112 when the first vertical follower 211a, the second vertical follower 211b, the third vertical follower 211c, and the fourth vertical follower 211d are at positions of FIG. 10A on the first flat cam 122a and the second flat cam 122b.

FIG. 10C is a set of cross-sectional perspective views of the adsorption apparatus 1000 when the first vertical follower 211a, the second vertical follower 211b, the third vertical follower 211c, and the fourth vertical follower 211d are at the positions of FIG. 10A on the first flat cam 122a and the second flat cam 122b.

Referring to FIG. 10, the first vertical follower 211a and the fourth vertical follower 211d move to the lowest positions on the first flat cam 122a and the second flat cam 122b, respectively, and in this case, levels of the first vertical follower 211a and the fourth vertical follower 211d in the Z-axis direction are the same. In addition, the second vertical follower 211b and the third vertical follower 211c move to the highest positions on the first flat cam 122a and the second flat cam 122b, respectively, and in this case, levels of the second vertical follower 211b and the third vertical follower 211c in the Z-axis direction are the same.

Accordingly, a pair of vertical movement members disposed in a diagonal direction with the frame 110 interposed therebetween are positioned at the same level in the Z-axis direction.

The first horizontal guide portion and the fourth horizontal guide portion are positioned at lower end portions of the first horizontal guide slit 112a and the fourth horizontal guide slit 112d, respectively, and the second horizontal guide portion and the third horizontal guide portion are positioned at upper end portions of the second horizontal guide slit 112b and the third horizontal guide slit 112c, respectively.

As a result, the first adsorption member 230a and the fourth adsorption member 230d disposed in a diagonal direction with the frame 110 therebetween move down in the Z-axis direction, and the second adsorption member 230b and the third adsorption member 230c disposed in a diagonal direction with respect to the second adsorption member 230b move up in the Z-axis direction. In addition, when the adsorption members move up or down in the Z-axis direction, the adsorption members move in the X-axis direction toward the frame 110 at the same time.

That is, the first adsorption member 230a and the fourth adsorption member 230d disposed in a diagonal direction with the frame 110 interposed therebetween move down in the Z-axis direction and move toward the frame 110 in the X-axis direction at the same time. In addition, the second adsorption member 230b and the third adsorption member 230c also move up in the Z-axis direction and move toward the frame 110 in the X-axis direction at the same time.

FIG. 11 illustrates a position of each component of the adsorption apparatus 1000 according to the first embodiment of the present invention when the main cam 120 moves backward in the Y-axis direction.

FIG. 11A illustrates the first vertical follower 211a and the second vertical follower 211b in contact with the first flat cam 122a, and the third vertical follower 211c and the fourth vertical follower 211d in contact with the second flat cam 122b.

FIG. 11B illustrates a position of the horizontal guide portion 221 in the horizontal guide slit 112 when the first vertical follower 211a, the second vertical follower 211b, the third vertical follower 211c, and the fourth vertical follower 211d are at positions of FIG. 11A on the first flat cam 122a and the second flat cam 122b.

FIG. 11C is a set of cross-sectional perspective views of the adsorption apparatus 1000 when the first vertical follower 211a, the second vertical follower 211b, the third vertical follower 211c, and the fourth vertical follower 211d are at the positions of FIG. 11A on the first flat cam 122a and the second flat cam 122b.

Referring to FIG. 11, the first vertical follower 211a and the fourth vertical follower 211d move to the highest positions on the first flat cam 122a and the second flat cam 122b, respectively, and in this case, levels of the first vertical follower 211a and the fourth vertical follower 211d in the Z-axis direction are the same. In addition, the second vertical follower 211b and the third vertical follower 211c move to the lowest positions on the first flat cam 122a and the second flat cam 122b, respectively, and in this case, levels of the second vertical follower 211b and the third vertical follower 211c in the Z-axis direction are the same.

Accordingly, a pair of vertical movement members disposed in a diagonal direction with the frame 110 interposed therebetween are positioned at the same level in the Z-axis direction.

The first horizontal guide portion and the fourth horizontal guide portion are positioned at the upper end portions of the first horizontal guide slit 112a and the fourth horizontal guide slit 112d, respectively, and the second horizontal guide portion and the third horizontal guide portion are positioned at the lower end portions of the second horizontal guide slit 112b and the third horizontal guide slit 112c, respectively.

As a result, the first adsorption member 230a and the fourth adsorption member 230d disposed in a diagonal direction with the frame 110 therebetween move up in the Z-axis direction, and the second adsorption member 230b and the third adsorption member 230c disposed in a diagonal direction with respect to the second adsorption member 230b move down in the Z-axis direction.

That is, the first adsorption member 230a and the fourth adsorption member 230d disposed in a diagonal direction with the frame 110 interposed therebetween move up in the Z-axis direction and move toward the frame 110 in the X-axis direction at the same time. In addition, the second adsorption member 230b and the third adsorption member 230c also move down in the Z-axis direction and move toward the frame 110 in the X-axis direction at the same time.

As illustrated in FIGS. 10 and 11, the main cam 120 of the present invention vertically moves a pair of vertical movement members, which are disposed in a diagonal direction with the frame 110 interposed therebetween among the vertical movement units 210, in the same direction, vertically moves a pair of vertical movement members, which are disposed on the same side surface of the frame 110, in different directions, and vertically moves a pair of vertical movement members, which are disposed opposite to each other with the frame 110 therebetween, in different directions.

FIG. 12 is a perspective view of the adsorption apparatus 1000 according to the first embodiment of the present invention when the main cam 120 moves forward in a state in which the battery cell 10 is adsorbed. FIG. 13 is a perspective view of the adsorption apparatus 1000 according to the first embodiment of the present invention when the main cam 120 moves backward in a state in which the battery cell 10 is adsorbed.

When the adsorption units 230 are at positions illustrated in FIGS. 12 and 13, the frame 110 of the present invention may generate an omnidirectional curvature in the battery cell 10 adsorbed by each adsorption member.

The main cam 120 included in the adsorption apparatus 1000 of the present invention moves linearly forward or backward in the Y-axis direction in a state in which the battery cell 10 is adsorbed, and the adsorption members receiving a driving force from the main cam 120 twist each corner of the battery cell 10 in the X-axis direction and the Z-axis direction while repeatedly moving between the positions of FIGS. 12 and 13.

In the adsorption apparatus 1000 of the present invention, the battery cell 10 is twisted through each adsorption member that moves in such a pattern such that excessive tension is not applied thereto. That is, since the adsorption apparatus 1000 of the present invention twists the battery cell 10 while leaving a margin in the X-axis direction, the battery cell 10 does not receive excessive stress due to the adsorption member. In addition, due to the twisting, it is possible to effectively drop the battery cells 10 or the like that are attached by static electricity.

Second Embodiment

An adsorption apparatus 1000 according to a second embodiment of the present invention further includes a press unit 240 in the adsorption apparatus 1000 according to the first embodiment. Thus, when the adsorption apparatus 1000 according to the second embodiment is described, content overlapping that already described for the adsorption apparatus 1000 according to the first embodiment will be omitted.

More specifically, the adsorption apparatus 1000 according to the second embodiment of the present invention includes the press unit 240 that hits an upper portion of the battery cell 10 while an omnidirectional curvature is generated in the battery cell 10 by adsorption members.

FIG. 14 is a perspective view of the adsorption apparatus 1000 from which a frame 110 is omitted according to the second embodiment of the present invention.

The adsorption apparatus 1000 according to the second embodiment of the present invention may mainly include a main body and an interlocking unit.

The main body includes the frame 110 linearly moving in a Z-axis direction, and a main cam 120 linearly reciprocating in a Y-axis direction inside the frame 110.

The interlocking unit includes vertical movement units 210 and adsorption units 230 and further includes the press unit 240 that is disposed below the main cam 120 and linearly reciprocates in the Z-axis direction in conjunction with the movement of the main cam 120.

Referring to FIG. 14, the press unit 240 is disposed to pass through a lower portion of the frame 110.

The press unit 240 includes a support part 241 which extends vertically and is coupled to be slidable with respect to the frame 110 and a pressing part 242 which extends from a lower end of the support part 241 in a width direction of the battery cell 10.

The press unit 240 of the present invention is restricted from moving in an X-axis direction and the Y-axis direction and is movable only in the Z-axis direction while the support part 241 is supported by the frame 110.

An upper portion of the support part 241 may extend in a moving direction of the main cam 120, that is, in the Y-axis direction, and through the extended portion, the press unit 240 may be supported on the frame 110 without being separated from the frame 110.

In order to prevent the battery cell 10 from being damaged by a hit of the press unit 240 when the battery cell 10 is twisted while an omnidirectional curvature is generated by the adsorption members, a concave surface having a parabolic shape may be formed at a lower portion of the pressing part 242.

The press unit 240 of the present invention moves in the Z-axis direction to hit an upper surface of the battery cell 10 through the concave surface formed at the lower portion of the pressing part 242.

As illustrated in FIG. 14, the press unit 240 includes a press follower 243 protruding in a curved shape from an upper portion.

The press follower 243 maintains contact with a lower surface of the main cam 120.

As illustrated in FIG. 14, the adsorption apparatus 1000 according to the second embodiment of the present invention may further include an elastic member 130 between the press unit 240 and the frame 110.

Even when the main cam 120 moves, the press unit 240 may remain in contact with a surface of the main cam 120 under an elastic force of the elastic member 130.

When the main cam 120 of the adsorption apparatus according to the second embodiment is at a regular position, the main cam 120 reciprocates forward or backward with respect to the regular position due to a driving unit (not shown) to allow a vertical movement member in contact with an upper portion thereof and the press follower 243 in contact with a lower portion thereof to be placed at specific levels.

FIGS. 15A and 15B illustrate the main cam 120 according to the second embodiment, wherein FIG. 15A is a perspective view of the main cam 120, and FIG. 15B is a front view, a side view, a plan view, and a bottom view of the main cam 120.

The main cam 120 of the adsorption apparatus 1000 according to the second embodiment is connected to the driving unit (not shown), which generates horizontal movement, and reciprocates inside the frame 110.

The main cam 120 includes a base plate 121 and a first flat cam 122a and a second flat cam 122b which protrude in a curved shape from an upper portion of the base plate 121. In addition, the main cam 120 includes a third flat cam 122c protruding downward from the base plate 121.

The third flat cam 122c protruding downward from the base plate 121 may be formed in multiple stages, but the present invention is not particularly limited thereto.

As illustrated in FIGS. 14 and 15A and 15B, the third flat cam 122c is formed in a curved shape and includes a concave groove at a central portion.

The press follower 243 linearly reciprocates in the Z-axis direction while moving along a bottom of the groove and both inclined surfaces of the groove.

The first flat cam 122a and the second flat cam 122b allow the vertical movement members in contact therewith to be positioned at specific levels, and the third flat cam 122c allows the press unit 240 in contact therewith to be positioned at a specific level.

The adsorption apparatus 1000 according to the second embodiment of the present invention allows the vertical movement members to be positioned at specific levels through the first flat cam 122a and the second flat cam 122b and allows an omnidirectional curvature to be generated in the battery cell 10 adsorbed by the adsorption unit 230. In addition, at the same time, the press unit 240 is allowed to linearly reciprocate in the Z-axis direction to hit the upper surface of the battery cell 10.

FIGS. 16 to 18 illustrate configurations of the adsorption apparatus 1000 which vary according to the movement of the main cam 120 according to the second embodiment of the present invention. Hereinafter, the operation of the adsorption apparatus 1000 according to the second embodiment will be described with reference to the drawings. However, content overlapping that already described for the adsorption apparatus 1000 according to the first embodiment will be omitted.

FIG. 16 is a perspective view of the adsorption apparatus 1000 according to the second embodiment of the present invention when the main cam 120 is in a ready state in a state in which the battery cell 10 is adsorbed.

The press follower 243 of the press unit 240 is positioned in a form in which the press follower 243 is inserted into the groove of the third flat cam 122c, and the pressing part 242 of the press unit 240 is positioned at the same position as a lower end portion of the adsorption member. That is, the press unit 240 is in a state before an omnidirectional curvature is generated in the battery cell 10, that is, in a state in which the battery cell 10 is not hit.

FIG. 17 is a perspective view of the adsorption apparatus 1000 according to the second embodiment of the present invention when the main cam 120 moves forward in a state in which the battery cell 10 is adsorbed.

As the main cam 120 moves forward in the Y-axis direction, the press follower 243 moves up along the inclined surface of the third flat cam 122c, and the press unit 240 moves down in the Z-axis direction to hit the upper surface of the battery cell 10 in which an omnidirectional curvature is generated.

FIG. 18 is a perspective view of the adsorption apparatus 1000 according to the second embodiment of the present invention when the main cam 120 moves backward in a state in which the battery cell 10 is adsorbed.

As the main cam 120 moves backward in the Y-axis direction, the press follower 243 moves up along the inclined surface of the third flat cam 122c, and the press unit 240 moves down in the Z-axis direction to hit the upper surface of the battery cell 10 in which an omnidirectional curvature is generated.

In comparison with the movement of the adsorption unit 230, the press unit moves downward simultaneously when at least one of the adsorption members provided at both sides of the frame 110 moves downward. That is, whenever the battery cell 10 adsorbed by the adsorption member is twisted, the press unit 240 may move downward to shake off the upper surface of the battery cell 10.

Due to the configuration of the press unit 240, the adsorption apparatus 1000 according to the second embodiment can more easily achieve the purpose of individually transporting the battery cells 10.

The present invention has been described above in more detail through the drawings and embodiments. However, the configurations described in the drawings or the embodiments in the specification are merely embodiments of the present invention and do not represent all the technical ideas of the present invention. Thus, it is to be understood that there may be various equivalents and variations in place of them at the time of filing the present application.

DESCRIPTION OF REFERENCE NUMERALS

10: battery cell
20: loading box
1000: adsorption apparatus
110: frame
111: vertical guide slit
111a: first vertical guide slit
111b: second vertical guide slit
111c: third vertical guide slit
111d: fourth vertical guide slit
112: horizontal guide slit
112a: first horizontal guide slit
112b: second horizontal guide slit
112c: third horizontal guide slit
112d: fourth horizontal guide slit
120: main cam
121: base plate
122: flat cam
122a: first flat cam
122b: second flat cam
122c: third flat cam
130: elastic member
210: vertical movement unit
210a: first vertical movement member
210b: second vertical movement member
210c: third vertical movement member
210d: fourth vertical movement member
211: vertical follower
211a: first vertical follower
211b: second vertical follower
211c: third vertical follower
211d: fourth vertical follower
212: reciprocating guide slit
220: horizontal movement unit
220a: first horizontal movement member
220b: second horizontal movement member
220c: third horizontal movement member
220d: fourth horizontal movement member
221: horizontal guide portion
221a: first horizontal guide portion
221b: second horizontal guide portion
221c: third horizontal guide portion
221d: fourth horizontal guide portion
230: adsorption unit
230a: first adsorption member
230b: first adsorption member
230c: first adsorption member
230d: first adsorption member
240: press unit
241: support part
242: pressing part
243: press follower

The invention claimed is:

1. A suction apparatus for suctioning an upper surface of each of a plurality of battery cells loaded in a loading box and sequentially taking out and transporting the battery cells, the suction apparatus comprising:
a main body including a frame which is configured to move linearly in a Z-axis direction and a main cam which is configured to linearly reciprocate in a Y-axis direction inside the frame; and
an interlocking unit including a vertical movement unit which is configured to move linearly in the Z-axis direction in conjunction with the main cam and a suction unit disposed at end portions of the vertical movement unit,
wherein the vertical movement unit includes a first vertical movement member and a second vertical movement member which extend to a first side of the frame in an X-axis direction and a third movement member and a fourth vertical movement member which extend to a second side of the frame in the X-axis direction, and
the main cam is configured to vertically move a diagonal pair of the vertical movement members of the vertical movement unit, which are disposed in a diagonal direction with the frame interposed therebetween, in a same direction, and
wherein the main cam is configured to vertically move a same side pair of the vertical movement members of the vertical movement unit, which are disposed at a same side surface of the frame, in different directions.

2. The suction apparatus of claim 1, wherein the main cam is configured to vertically move an opposite side pair of the vertical movement members of the vertical movement unit, which are disposed opposite to each other with the frame interposed therebetween, in different directions.

3. The suction apparatus of claim 1, wherein the main cam includes a first flat cam configured to move the first vertical movement member and the second vertical movement member in opposite directions, and a second flat cam configured to move the third vertical movement member and the fourth vertical movement member in opposite directions, and the first flat cam and the second flat cam have cam profiles that complement each other.

4. The suction apparatus of claim 1, wherein the frame has a vertical guide slit having a linear shape formed in the Z-axis direction of the frame that is configured to guide movement of the vertical movement unit.

5. The suction apparatus of claim 4, wherein the vertical movement unit extends through the vertical guide slit and is coupled to the frame, and the vertical movement unit is configured to move in the Z-axis direction along the vertical guide slit.

6. The suction apparatus of claim 1, further comprising an elastic member disposed between the vertical movement unit and the frame.

7. The suction apparatus of claim 1, wherein the interlocking unit further includes a press unit which is disposed below the main cam, the press unit passing through a lower portion of the frame, the press unit being configured to linearly reciprocate in the Z-axis direction in conjunction with movement of the main cam.

8. The suction apparatus of claim 7, wherein the press unit includes a support part which vertically extends and is slidable relative to the frame and a pressing part which extends from a lower end of the support part in a width direction of the battery cells and has a parabolic concave surface disposed at a lower portion thereof.

9. A suction apparatus for suctioning an upper surface of each of a plurality of battery cells loaded in a loading box and sequentially taking out and transporting the battery cells, the suction apparatus comprising:

a main body including a frame which is configured to move linearly in a Z-axis direction and a main cam which is configured to linearly reciprocate in a Y-axis direction inside the frame; and an interlocking unit including a vertical movement unit which is configured to move linearly in the Z-axis direction in conjunction with the main cam and a suction unit disposed at end portions of the vertical movement unit, wherein the vertical movement unit includes a first vertical movement member and a second vertical movement member which extend to a first side of the frame in an X-axis direction and a third movement member and a fourth vertical movement member which extend to a second side of the frame in the X-axis direction, and the main cam is configured to vertically move a diagonal pair of the vertical movement members of the vertical movement unit, which are disposed in a diagonal direction with the frame interposed therebetween, in a same direction, and wherein the interlocking unit further includes a horizontal movement unit which surrounds the vertical movement unit, the horizontal movement unit being configured to move in the Z-axis direction together with the vertical movement unit, and the frame has a horizontal guide slit assembly having a curved shape formed in the Z-axis direction of the frame that is configured to guide movement of the horizontal movement unit linearly in the X-axis direction independently of the vertical movement unit.

10. The suction apparatus of claim 9, wherein the horizontal guide slit assembly includes a first horizontal guide slit and a second horizontal guide slit that are symmetrical to each other and that extend into a first surface of the frame perpendicular to a moving direction of the main cam, and the horizontal guide slit assembly includes a third horizontal guide slit and a fourth horizontal guide slit that are respectively symmetrical to the first horizontal guide slit and the second horizontal guide slit and extend into a second surface of the frame.

11. The suction apparatus of claim 10, wherein a pair of the horizontal guide slits formed in a same surface of the frame have parabolic shapes in which a separation distance between the parabolic shapes at ends of the horizontal guide slits is shorter than a separation distance at centers of the horizontal guide slits.

12. The suction apparatus of claim 9, wherein the suction unit is fixed to the horizontal movement unit and is separated from the vertical movement unit.

13. The suction apparatus of claim 12, wherein the suction unit is disposed at an extended end portion of the vertical movement unit and extends downward from the horizontal movement unit.

14. The suction apparatus of claim 12, wherein the suction unit is configured to simultaneously move in the Z-axis direction by movement of the vertical movement unit and in the X-axis direction by movement of the horizontal movement unit.

* * * * *